United States Patent
Dingeldein et al.

(10) Patent No.: US 8,800,808 B2
(45) Date of Patent: Aug. 12, 2014

(54) BIN SIDEWALL PANEL CONCEPT

(75) Inventors: Mark S. Dingeldein, Milford, IN (US);
Rodney B. Grossman, Goshen, IN (US);
Justin M. Holmes, Valparaiso, IN (US)

(73) Assignee: CTB, Inc., Milford, IN (US)

( * ) Notice: Subject to any disclaimer, the term of this patent is extended or adjusted under 35 U.S.C. 154(b) by 894 days.

(21) Appl. No.: 12/409,104

(22) Filed: Mar. 23, 2009

(65) Prior Publication Data

US 2009/0242577 A1    Oct. 1, 2009

Related U.S. Application Data

(60) Provisional application No. 61/038,845, filed on Mar. 24, 2008.

(51) Int. Cl.
*B65D 6/00*    (2006.01)

(52) U.S. Cl.
USPC .......... 220/693; 220/650; 220/654; 220/670; 220/4.17

(58) Field of Classification Search
USPC ........ 220/650, 676, 693, 654, 670, 565, 4.12, 220/4.17, 680, 692; 52/192, 745.01, 266, 52/578, 783.11
See application file for complete search history.

(56) References Cited

U.S. PATENT DOCUMENTS

| | | | |
|---|---|---|---|
| 1,307,333 A | 6/1919 | Armstrong | |
| 1,336,945 A | 4/1920 | Dickelman | |
| 1,875,666 A * | 9/1932 | Schwemlein | 220/693 |
| 1,943,191 A * | 1/1934 | Schwemlein | 220/565 |
| 1,977,391 A | 10/1934 | Kramer | |
| 2,750,013 A | 6/1956 | Johnson et al. | |
| 2,897,926 A | 8/1959 | Hawthorne | |
| 3,237,295 A | 3/1966 | Konzak | |
| 4,009,520 A | 3/1977 | Sukup | |
| 4,197,689 A * | 4/1980 | DeMuth | 52/745.01 |
| 4,218,859 A | 8/1980 | Sams | |
| 4,240,562 A | 12/1980 | Holschlag | |
| 4,319,411 A | 3/1982 | Steffen | |
| 4,412,392 A | 11/1983 | Keller | |
| 4,449,646 A | 5/1984 | Bonerb et al. | |

(Continued)

FOREIGN PATENT DOCUMENTS

FR    1453297 A    6/1966

OTHER PUBLICATIONS

Written Opinion and International Search Report mailed May 18, 2009 for corresponding International Application No. PCT/US09/038065; 11 pages.
Brock, "Construction Manual", Sep. 2008.

(Continued)

*Primary Examiner* — Jeffrey Allen
(74) *Attorney, Agent, or Firm* — Harness, Dickey

(57) ABSTRACT

A storage bin may include a corrugated outer sidewall, a generally flat inner sidewall, and a first fastener. The corrugated outer sidewall may support a hoop tension provided by a material within the storage bin and may include a series of horizontally extending corrugations forming alternating grooved portions defining alternating circumferentially extending radially inner and outer ridges vertically spaced from one another along a vertical extent of the outer sidewall. The corrugated outer sidewall may define a first aperture. The generally flat inner sidewall may support the hoop tension, abut the radially inner ridges, and define a second aperture. The first fastener may extend through the first and second apertures and may couple the inner and outer sidewalls to one another.

17 Claims, 5 Drawing Sheets

(56) References Cited

U.S. PATENT DOCUMENTS

| | | | |
|---|---|---|---|
| 4,603,525 A * | 8/1986 | Byers et al. | 52/245 |
| 4,625,478 A * | 12/1986 | Goode | 52/197 |
| 4,862,661 A | 9/1989 | Moore | |
| 5,009,052 A * | 4/1991 | Welch | 52/745.01 |
| 5,632,674 A | 5/1997 | Miller, Jr. | |
| 5,702,052 A | 12/1997 | Bonner | |
| 6,311,952 B2 | 11/2001 | Bainter | |
| 7,338,359 B2 | 3/2008 | Grossman et al. | |
| 7,392,624 B2 | 7/2008 | Kinzer | |
| 2005/0072107 A1 | 4/2005 | Kebeli | |
| 2005/0229501 A1 | 10/2005 | Grossman et al. | |
| 2007/0151974 A1 | 7/2007 | Boyd | |

OTHER PUBLICATIONS

Supplemental European Search Report for PCT/US2009/038065, May 13, 2011.

* cited by examiner

BIN SIDEWALL PANEL CONCEPT

CROSS-REFERENCE TO RELATED APPLICATIONS

This application claims the benefit of U.S. Provisional Application No. 61/038,845, filed on Mar. 24, 2008. The entire disclosure of the above application is incorporated herein by reference.

FIELD

The present disclosure relates to storage bins, and more specifically to a sidewall structure of a storage bin.

BACKGROUND

The statements in this section merely provide background information related to the present disclosure and may not constitute prior art.

Commercial storage bins for materials such as grain may include a roof and a wall structure formed from a number of corrugated sheets and vertical column members. The column members may generally support the roof and the corrugated sheets may support an internal pressure (or outward radial force) applied by the material stored within the storage bin. The column members may additionally support a load applied on the corrugated sheets due to friction applied to the sheets by grain.

As the storage capacity of a storage bin increases as a result of increased bin height and diameter, the hoop tension applied to the wall structure may increase due to an increased internal pressure (creating an outward radial force) within the storage bin resulting from an increased mass of the stored material. Typical commercial storage bins may include corrugated sheets having a material thickness of 4.2 millimeters (mm) or less (8 gauge material). When bin size increases, the overall material thickness of the corrugated sheets may be increased in order to accommodate the increased hoop stress. Therefore, multiple corrugated sheets may be laminated to provide the increased material thickness. The outward radial force may additionally increase the downward force on the sheets (e.g. due to friction), which may be amplified by the corrugated surface of the sheets.

SUMMARY

This section provides a general summary of the disclosure, and is not a comprehensive disclosure of its essential features, full scope or all possible features.

A storage bin may include a corrugated outer sidewall, a generally flat inner sidewall, and a first fastener. The corrugated outer sidewall may support a portion of the hoop tension load provided by a material within the storage bin and may include a series of horizontally extending corrugations forming alternating grooved portions defining alternating circumferentially extending radially inner and outer ridges vertically spaced from one another along a vertical extent of the outer sidewall. The corrugated outer sidewall may define a first aperture. The generally flat inner sidewall may support a portion of the hoop tension load, abut the radially inner ridges, and define a second aperture. The first fastener may extend through the first and second apertures and may couple the inner and outer sidewalls to one another.

In another arrangement, a storage bin may include a corrugated outer sidewall, a generally flat inner sidewall, and a first fastener. The corrugated outer sidewall may include first and second corrugated sheets having horizontally extending corrugations forming alternating grooved portions defining alternating circumferentially extending radially inner and outer ridges vertically spaced from one another along a vertical extent of the outer sidewall. A horizontal end of the first corrugated sheet may define a first aperture and a horizontal end of the second corrugated sheet may define a second aperture. The generally flat inner sidewall may include first and second generally flat sheets abutting the radially inner ridges. A horizontal end of the first flat sheet may define a third aperture and a horizontal end of the second flat sheet may define a fourth aperture. The horizontal ends of the first corrugated sheet and the first flat sheet may overlap the horizontal ends of the second corrugated sheet and the second flat sheet (to form a vertical seam). The first corrugated sheet and the first flat sheet may extend in a first horizontal direction and the second corrugated sheet and the second flat sheet may extend in a second horizontal direction opposite the first horizontal direction. The second corrugated sheet may be located radially between the first corrugated sheet and the first flat sheet and the first flat sheet may be located radially between the second corrugated sheet and the second flat sheet. The first fastener may extend in order, first through the first aperture, then through the second aperture, then through the third aperture, and then through the fourth aperture to couple the inner and outer sidewalls to one another.

In another arrangement, a storage bin may include a corrugated outer sidewall, a generally flat inner sidewall, a first fastener, a column member, and a roof assembly. The corrugated outer sidewall may form an outer hoop supporting a portion of a hoop tension load provided by a material within the storage bin and may include a series of horizontally extending corrugations forming alternating grooved portions defining alternating circumferentially extending radially inner and outer ridges vertically spaced from one another along a vertical extent of the outer sidewall. The corrugated outer sidewall may additionally define a first aperture. The generally flat inner sidewall may form an inner hoop supporting a portion of the hoop tension load and defining a second aperture. The first fastener may extend through the first and second apertures and may couple the inner and outer sidewalls to one another. The column member may be fixed to the inner and outer sidewalls and may support a vertical load of the storage bin. The roof assembly may be supported by the column members. The overall radial material thickness of the combined inner and outer sidewalls may be greater at a region near a base of the storage bin than at a region near the roof assembly.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
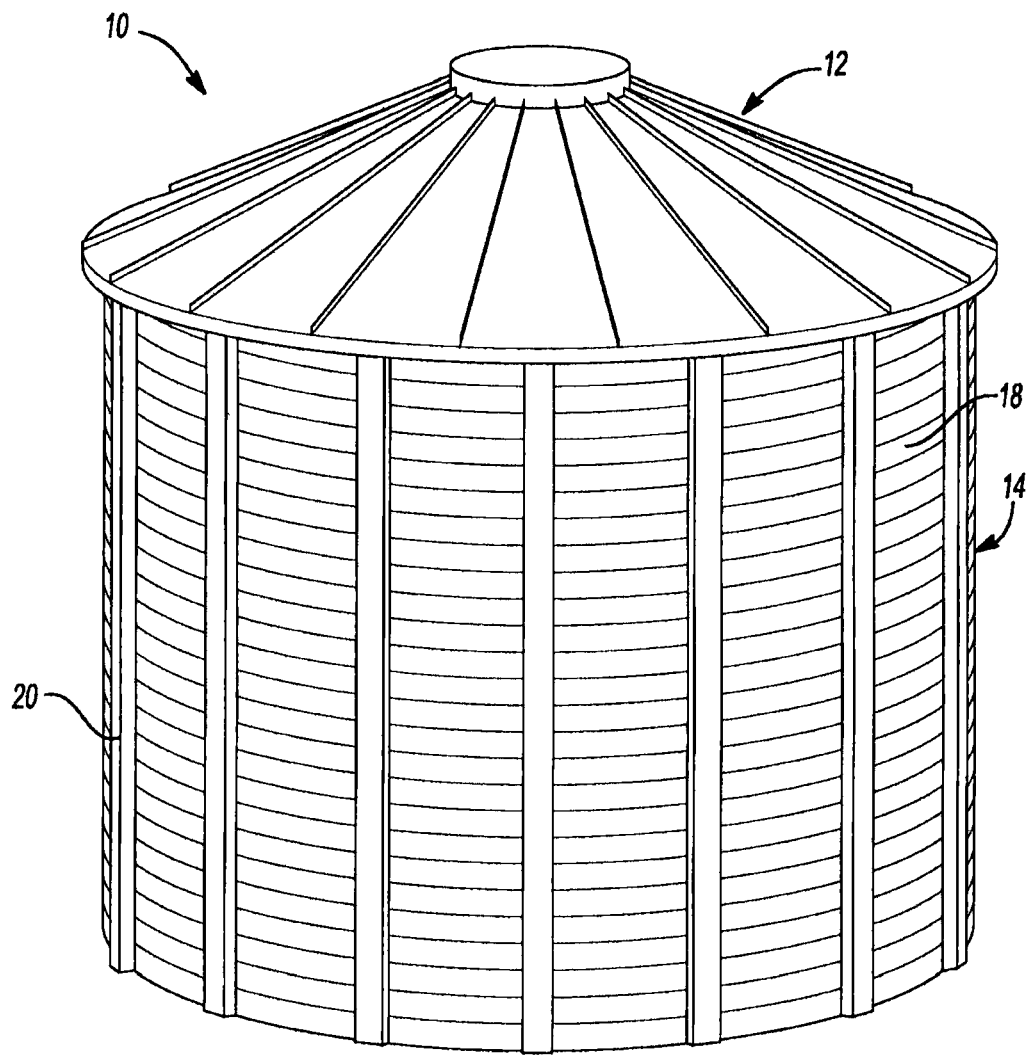
FIG. 1 is a schematic illustration of a storage bin according to the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1, a storage bin 10 is illustrated. Storage bin 10 may be used for storing a variety of materials including grain. Storage bin 10 may include a roof assembly 12 fixed to a sidewall assembly 14. With additional reference to FIGS. 2-4, sidewall assembly 14 may include inner panels 16, outer panels 18, column members 20, and first and second fastener assemblies 21, 22. Alternatively, storage bin 10 may be constructed without the use of column members 20.

Inner panels 16 may form an inner sidewall and may include a series of generally flat panels having apertures 24 extending therethrough. The inner sidewall may form a plurality of inner hoops of the storage bin 10. Inner panels 16 may form an interior of storage bin 10, providing a generally smooth interior surface for storage bin 10. The generally smooth interior surface formed by the inner panels 16 may reduce the frictional load (or force) applied to the sidewall assembly 14 by the material contained therein. For example, as seen in the drawings, the vertical ends of adjacent inner panels 16 may form a horizontal seam having a butt joint connection. During construction a small gap may initially exist between the vertical ends of adjacent inner panels 16, which is eliminated as a result of subsequent vertical loading.

Outer panels 18 may form an outer sidewall and may include a series of corrugated panels having horizontally oriented alternating grooved portions 26, 27 and apertures 28 extending therethrough. The outer sidewall may form a plurality of outer hoops of the storage bin 10. For example, adjacent outer corrugated panels 18 may overlap at their vertical edges to form a horizontal seam having a lap joint. A series of fasteners may be provided to form a generally continuous connection along such a horizontal seam. Grooved portions 26 may define radially outer ridges 29 and grooved portions 27 may define radially inner ridges 31. Radially inner ridges 31 may abut inner panels 16.

Inner and outer panels 16, 18 may be formed from similar or different materials. For example, outer panels 18 may be formed from galvanized steel and inner panels 16 may be formed from a stainless steel. Additionally, while shown as corrugated panels having generally smooth grooved portions 26, 27, it is understood that outer panels 18 may take a variety of forms including alternating square channels and alternating V-shaped channels.

Figure 6:
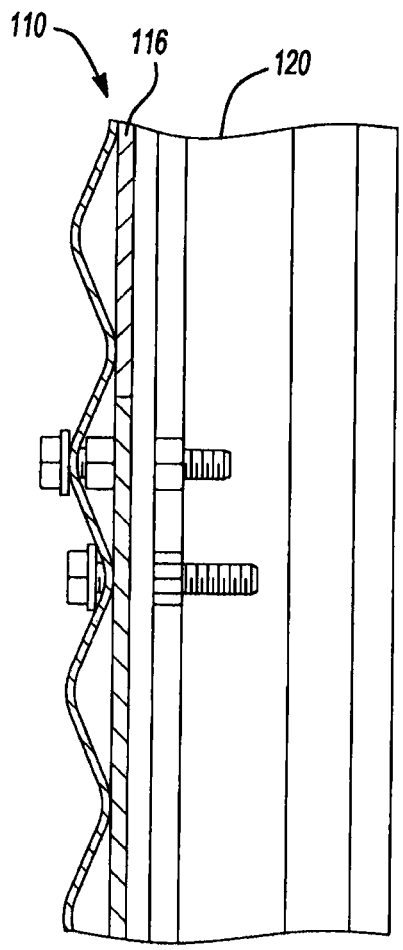
FIG. 6 is a fragmentary section view of an alternate sidewall assembly according to the present disclosure.

Column members 20 may include a series of apertures 30 and may be located on an exterior of storage bin 10 to form a vertical support for roof assembly 12. In an alternate arrangement shown in FIG. 6, column members 120 may be located within storage bin 110 and may abut inner panels 116. Storage bin 110 may be similar to storage bin 10 with the exception of the location of column members 120. In either case, the outer panels 18 and the column members 20 can be the primary vertical load path at any horizontal seams.

Figure 3:
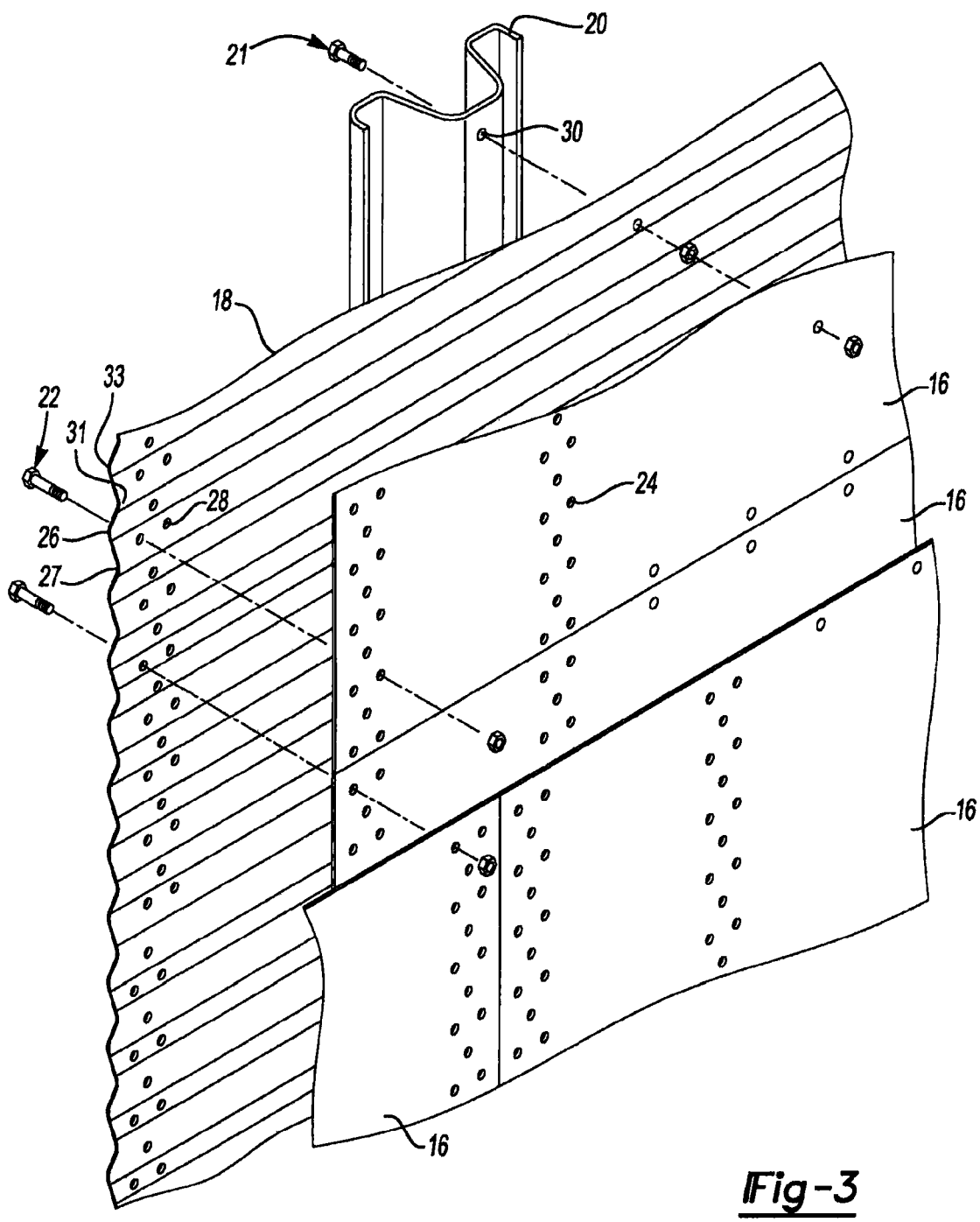
FIG. 3 is a fragmentary perspective exploded view of the sidewall assembly shown in FIG. 2.
Figure 4:
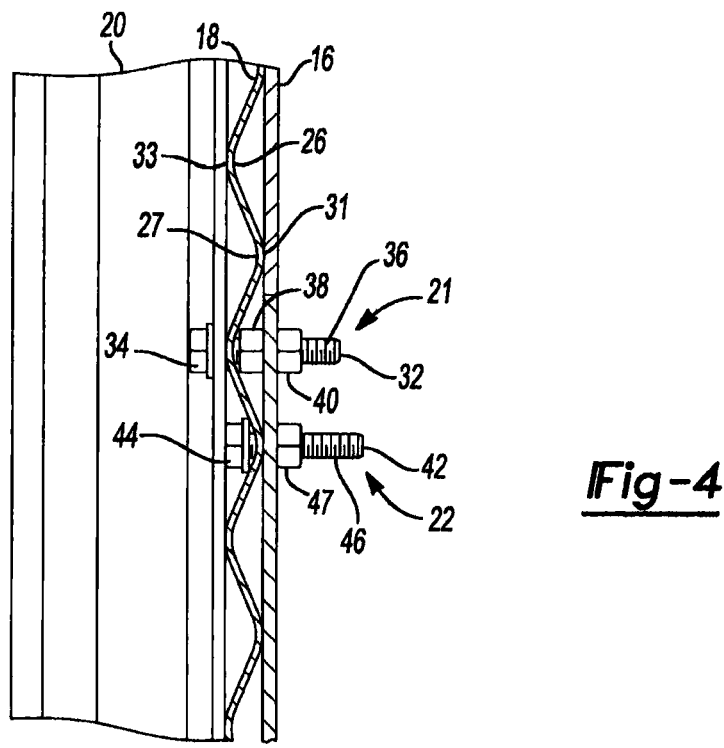
FIG. 4 is a fragmentary section view of the sidewall assembly of the storage bin of FIG. 1.

Referring to FIGS. 3 and 4, inner and outer panels 16, 18 may be fixed to one another and to column members 20 using first and second fastener assemblies 21, 22. More specifically, outer panels 18 may be located radially between inner panels 16 and column members 20. For example, as seen in FIG. 3, one of apertures 24, 28 in each of inner and outer panels 16, 18 may be aligned with one another and with an aperture 30 in column member 20. First fastener assembly 21 may fix inner and outer panels 16, 18 to column member 20. The inner and outer panels 16, 18 may both support the hoop tension from the radial load (or internal pressure) provided by the material within the storage bin 10. The hoop tension load created by the radial load (or internal pressure) on the sidewall assembly 14 may be shared by the inner and outer sidewalls.

First fastener assembly 21 may include a fastener 32, having a head 34 and a threaded shank 36, and first and second nuts 38, 40. An exterior surface of grooved portion 26 (radially outer ridge 33) may abut column member 20 and an interior surface of grooved portion 27 (radially inner ridge 31) may abut inner panel 16. Fastener 32 may pass through apertures 24, 28, 30. Head 34 may abut an outer radial surface of column member 20. First nut 38 may be located radially between and may abut inner and outer panels 16, 18 and may be engaged with threaded shank 36. Second nut 40 may be engaged with threaded shank 36 and may abut an inner radial surface of inner panel 16.

Second fastener assembly 22 may include a fastener 42, having a head 44 and a threaded shank 46, and a nut 47. Head 44 may be located radially inward relative to column member 20 and may engage an outer radial surface of grooved portion 27. Threaded shank 46 may pass through an aperture 28 extending through grooved portion 27 and through a corresponding aperture 24 in inner panel 16. Nut 47 may be engaged with threaded shank 46 and may abut an inner radial surface of inner panel 16 to fix inner and outer panels 16, 18 to one another. It is understood that a variety of alternate fastener assemblies may be used in place of first and second fastener assemblies 21, 22, such as rivets. It is understood that numerous first and second fastener assemblies are used throughout bin 10 to fix inner and outer panels 16, 18 to one another and to column member 20. For example, the inner panels 16 and outer panels 18 may be connected to each other by first and/or second fastener assemblies 21, 22 throughout the sidewall 14. Further, it is understood that the number of inner panels 16 used may vary based on the location within bin 10.

For example, a single inner panel 16 and a single outer panel 18 layer may be used to form a radial extent of the sidewall assembly 14 of bin 10. Alternatively, multiple inner panels 16 may be used in an overlapping construction to increase the hoop strength of sidewall assembly 14 of bin 10. Bin 10 may have a lesser radial load (or internal pressure) applied by a material, such as grain, contained within bin 10 at a location near roof assembly 12 relative to a base of bin 10. Therefore, the overall material thickness of a ring (or first hoop region) of sidewall assembly 14 near the base of bin 10 may be greater than the overall material thickness of a ring (or second hoop region) located near roof assembly 12.

Figure 2:
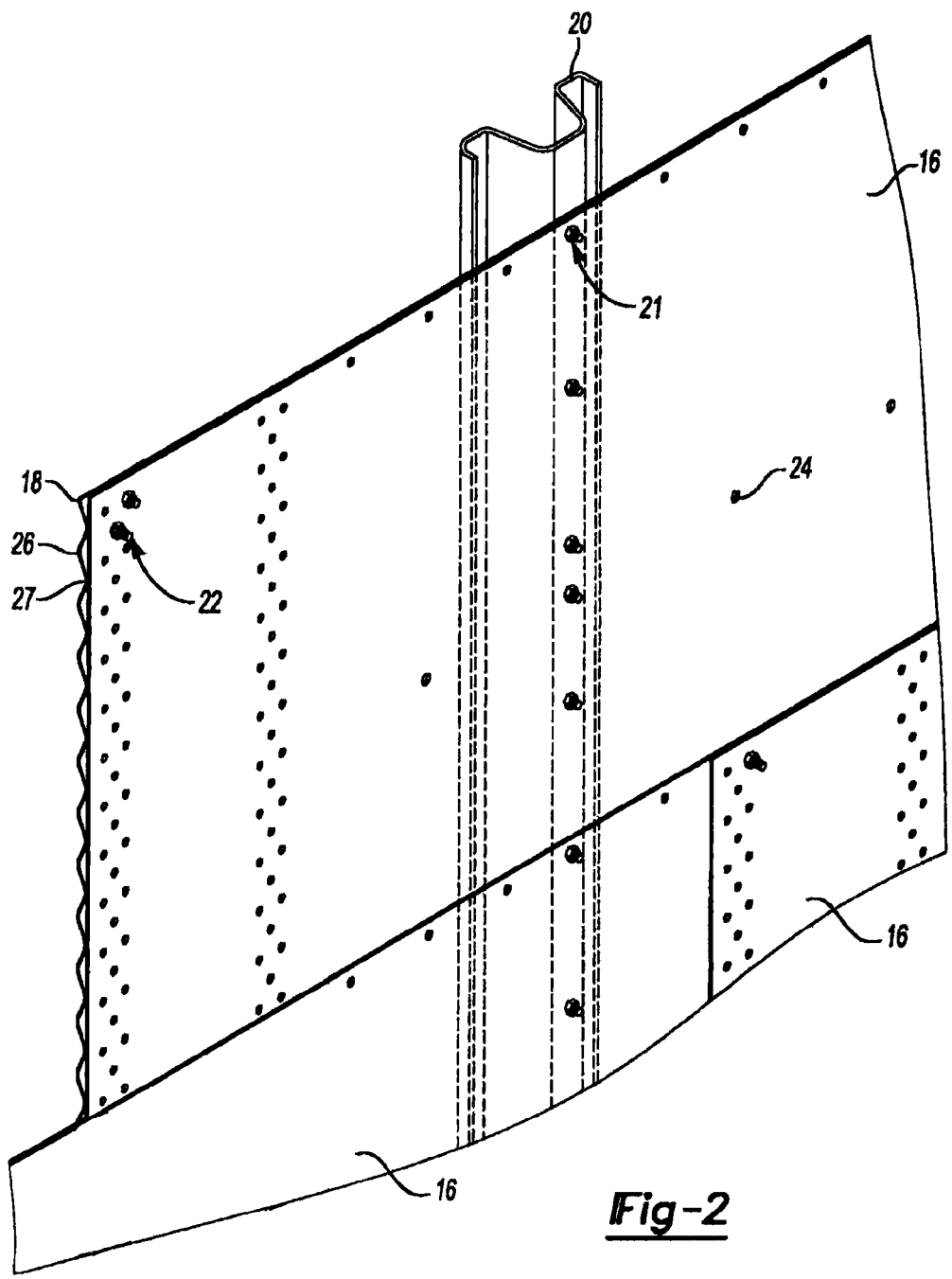
FIG. 2 is a fragmentary perspective view of the sidewall assembly of the storage bin of FIG. 1.

As indicated above, the increased radial material thickness may be created by overlapping inner panels 16. FIGS. 2 and 3 illustrate multiple inner panels 16 overlapping to create the increased radial material thickness of the first hoop region of sidewall assembly 14. Alternatively, a single layer of inner panels 16 having an increased material thickness may be used to form a ring of sidewall assembly 14.

As a result, a single layer of outer panels 18 may be used to form sidewall assembly 14. Rather than laminating a series of corrugated outer panels 18, the number or thickness of inner panels 16 may be adjusted to accommodate a desired radial load (or internal pressure). For example, bin 10 may have a diameter greater than 30 meters (m) and may have a single layer of corrugated outer panels 18 having a radial material thickness of 4.2 millimeters (mm) or less. Inner panels 16 may have a radial material thickness at a location near the base of bin 10 of greater than 5.0 mm. The thickness may be achieved by using a single layer of inner panels 16 having the desired material thickness or by an overlapping arrangement, such as a laminated assembly. In another arrangement, the increased material thickness may be created by overlapping outer panels 18.

Figure 5:
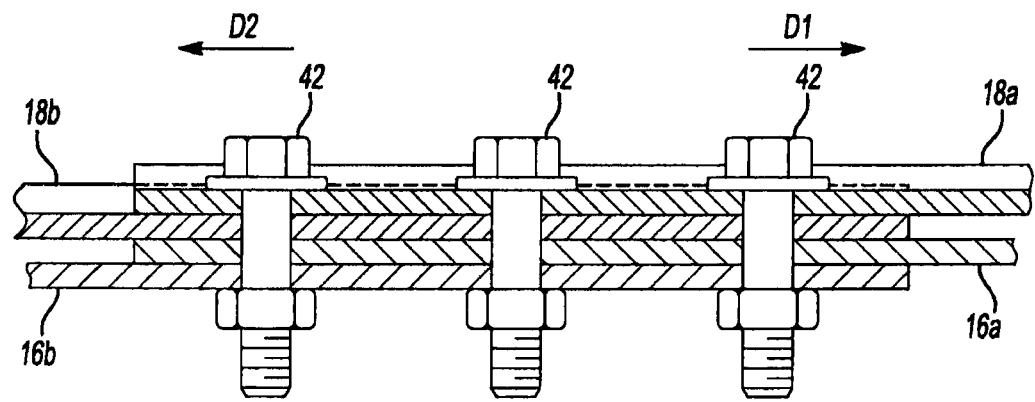
FIG. 5 is a section view of a fastening arrangement of the sidewall assembly of FIG. 1.

Additionally, seam locations where adjacent inner panels 16 and adjacent outer panels 18 are coupled to one another may be arranged to reduce a shear load on first and second fastener assemblies 21, 22. FIG. 5 illustrates an arrangement between inner and outer panels 16, 18 and second fastener assemblies 22. The arrangement of FIG. 5 may generally provide for an alternating shear load applied along an axial extent of fasteners 42.

A first inner panel 16a may have a horizontal end overlapping a horizontal end of a second inner panel 16b (to form a vertical seam). First inner panel 16a may extend in a first direction (D1) from fasteners 42 and second inner panel 16b may extend in a second direction (D2) generally opposite the first direction (D1) from fasteners 42. Similarly, a first outer panel 18a may have a horizontal end overlapping a horizontal end of a second outer panel 18b (to form a vertical seam). First outer panel 18a may extend in the first direction (D1) from fasteners 42 and second outer panel 18b may extend in the second direction (D2) from fasteners 42. Second outer panel 18b may be located radially inward from first outer panel 18a, first inner panel 16a may be located radially inward from second outer panel 18b, and second inner panel 16b may be located radially inward from first inner panel 16a. First and second inner panels 16a, 16b may define apertures 24a, 24b aligned with apertures 28a, 28b in first and second outer panels 18a, 18b. Fasteners 42 may be located within apertures 24a, 24b, 28a, 28b. Therefore, the shear force applied to fastener 42 may alternate between the first and second directions (D1, D2) along the axial extent of fastener 42.

Figure 7:
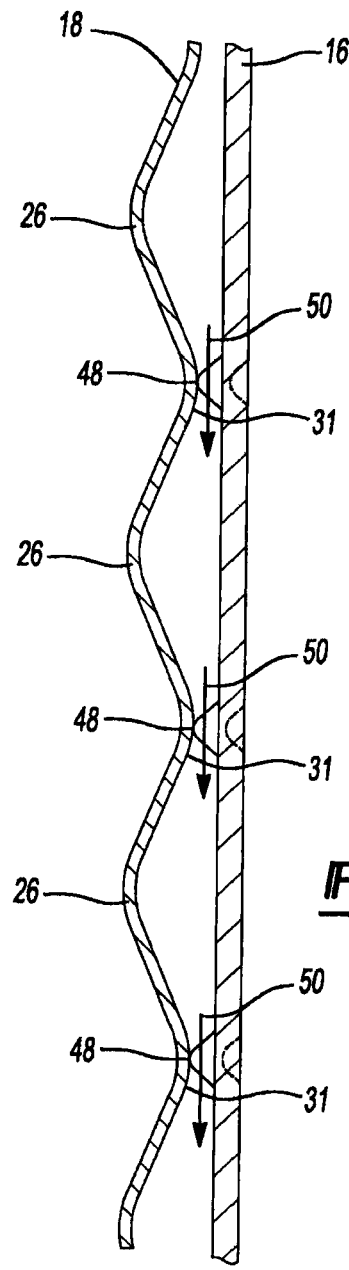
FIG. 7 is a fragmentary section view of the sidewall assembly of the storage bin of FIG. 1.

Additionally, as seen in FIG. 7, inner panels 16 may include protrusions 48 extending radially outward therefrom. The protrusions 48 may abut the radially inner ridges 31 forming vertical communication paths 50 between adjacent ones of grooved portions 26. Vertical communication paths 50 may prevent the retention of moisture within the grooved portions 26 during extreme conditions where temperatures vary greatly between the inside of the storage bin 10 and the surrounding atmosphere.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A storage bin comprising:
a corrugated outer sidewall supporting a portion of a hoop tension load provided by a material within the storage bin and including a series of horizontally extending corrugations forming alternating grooved portions defining alternating circumferentially extending radially inner and outer ridges vertically spaced from one another along a vertical extent of the outer sidewall, the corrugated outer sidewall defining a first aperture, and the corrugated outer sidewall including a plurality of corrugated sheets with vertically adjacent corrugated sheets of the corrugated outer wall forming a horizontal overlapping joint seam;
a rigid metallic generally flat inner sidewall supporting a portion of the hoop tension load, abutting the radially inner ridges and defining a second aperture, the flat inner sidewall including a plurality of flat sheets with vertically adjacent flat sheets of the flat inner sidewall forming a horizontal end-against-end butt joint seam and horizontally adjacent flat sheets of the flat inner sidewall forming a vertical overlapping joint seam; and
a first fastener extending through the first aperture of the corrugated outer side wall and the second aperture of the flat inner side wall and coupling the inner and outer sidewalls to one another;
wherein the corrugated outer sidewall includes first and second corrugated sheets and the inner sidewall includes first and second flat sheets, the first corrugated sheet extending in a first horizontal direction and including a first horizontal end portion defining the first aperture, the first flat sheet located radially between the second corrugated sheet and the second flat sheet, extending in the first horizontal direction, and including a second horizontal end portion defining the second aperture, the second corrugated sheet located radially between the first corrugated sheet and the first flat sheet, extending in a second horizontal direction opposite the first horizontal direction, and including a third horizontal end portion defining a third aperture, and the second flat sheet extending in the second horizontal direction and including a fourth horizontal end portion defining a fourth aperture, the fastener passing through the first, second, third, and fourth apertures and coupling the outer sidewall to the inner sidewall.

2. The storage bin of claim 1, wherein the inner sidewall includes an integrally formed protrusion extending radially outward therefrom and abutting one of the radially inner ridges creating a vertical communication path between adjacent grooved portions facing the inner sidewall.

3. The storage bin of claim 1, wherein the inner sidewall includes first and second hoop regions along a vertical extent thereof, the first hoop region being located between the second hoop region and a base of the storage bin and defining an overall inner sidewall material thickness greater than an overall inner sidewall material thickness of the second region.

4. The storage bin of claim 3, wherein the first hoop region includes first and second flat sheets overlying one another to form the overall increased sidewall material thickness relative to the second hoop region.

5. The storage bin of claim 1, wherein the first aperture extends through one of the radially inner ridges.

6. The storage bin of claim 5, wherein the fastener includes a head, a threaded shank and a nut, the head abutting a radially outer surface of the outer sidewall and the nut being engaged with the threaded shank and abutting a radially inner surface of the inner sidewall.

7. The storage bin of claim 1, further comprising a column member fixed to the inner and outer sidewalls and supporting a vertical load of the storage bin.

8. The storage bin of claim 7, wherein the column member is located radially outside of the outer sidewall and fixed thereto.

9. The storage bin of claim 8, wherein the column member includes a third aperture, the fastener including a head, a threaded shank, and first and second nuts, the first aperture extending through one of the radially outer ridges, the threaded shank extending through the first, second, and third apertures, the head abutting an outer surface of the column member, the first nut being threaded on the shank between the inner and outer sidewall, and the second nut being threaded on the shank and abutting a radially inner surface of the inner sidewall.

10. The storage bin of claim 7, wherein the column member is located radially inside of the inner sidewall and fixed thereto.

11. The storage bin of claim 7, further comprising a roof assembly supported by the column members.

12. The storage bin of claim 1, wherein the inner and outer sidewalls are generally cylindrical.

13. A storage bin comprising:
a corrugated outer sidewall including first and second corrugated sheets having horizontally extending corrugations forming alternating grooved portions defining alternating circumferentially extending radially inner and outer ridges vertically spaced from one another along a vertical extent of the outer sidewall, a horizontal end of the first corrugated sheet defining a first aperture and a horizontal end of the second corrugated sheet defining a second aperture;
a rigid metallic generally flat inner sidewall including first and second generally flat sheets abutting the radially inner ridges, a horizontal end of the first flat sheet defining a third aperture and a horizontal end of the second flat sheet defining a fourth aperture, the horizontal ends of the first corrugated sheet and the first flat sheet overlapping the horizontal ends of the second corrugated sheet and the second flat sheet, the first corrugated sheet and the first flat sheet extending in a first horizontal direction and the second corrugated sheet and the second flat sheet extending in a second horizontal direction opposite the first horizontal direction, the second corrugated sheet being located radially between the first corrugated sheet and the first flat sheet, and the first flat sheet being located radially between the second corrugated sheet and the second flat sheet; and
a first fastener extending in order, first through the first aperture, then through the second aperture, then through the third aperture, and then through the fourth aperture and coupling the inner and outer sidewalls to one another and joining both the first and second flat sheets and the first and second corrugated sheets along a common vertical overlapping seam for both the corrugated outer sidewall and the flat inner sidewall.

14. The storage bin of claim 13, wherein the one of the first and second flat sheets includes an integrally formed protrusion extending radially outward therefrom and abutting one of the first and second corrugated sheets.

15. The storage bin of claim 13, further comprising a column member fixed to the inner and outer sidewalls and supporting a vertical load of the storage bin.

16. The storage bin of claim 15, further comprising a roof assembly supported by the column members.

17. A storage bin comprising:
a corrugated outer sidewall forming an outer hoop supporting a hoop tension provided by a material within the storage bin and including a series of horizontally extending corrugations forming alternating grooved portions defining alternating circumferentially extending radially inner and outer ridges vertically spaced from one another along a vertical extent of the outer sidewall, the corrugated outer sidewall defining a first aperture;
a rigid metallic generally flat inner sidewall forming an inner hoop supporting the hoop tension and defining a second aperture;
a first fastener extending through the first and second apertures and coupling the inner and outer sidewalls to one another;
a column member fixed to the inner and outer sidewalls and supporting a vertical load of the storage bin; and
a roof assembly supported by the column members, the overall radial material thickness of the combined inner and outer sidewalls being greater at a region near a base of the storage bin than a region near the roof assembly;
wherein the inner sidewall includes an integrally formed protrusion provided as embossment of the inner sidewall and extending radially outward from an outer surface contacting against one of the radially inner ridges and creating a vertical communication path between radially inner ridges of adjacent grooved portions and the outer surface of the inner sidewall;
wherein the corrugated outer sidewall includes first and second corrugated sheets and the inner sidewall includes first and second flat sheets, the first corrugated sheet extending in a first horizontal direction and including a first horizontal end portion defining the first aperture, the first flat sheet located radially between the second corrugated sheet and the second flat sheet, extending in the first horizontal direction, and including a second horizontal end portion defining the second aperture, the second corrugated sheet located radially between the first corrugated sheet and the first flat sheet, extending in a second horizontal direction opposite the first horizontal direction, and including a third horizontal end portion defining a third aperture, and the second flat sheet extending in the second horizontal direction and including a fourth horizontal end portion defining a fourth aperture, the fastener passing through the first, second, third, and fourth apertures and coupling the outer sidewall to the inner sidewall.

\* \* \* \* \*